(12) United States Patent
Furukawa

(10) Patent No.: US 8,995,004 B2
(45) Date of Patent: Mar. 31, 2015

(54) CONTROL APPARATUS OF NON-VOLATILE MEMORY AND IMAGE FORMING APPARATUS

(71) Applicant: Canon Kabushiki Kaisha, Tokyo (JP)

(72) Inventor: Hitoshi Furukawa, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 13/926,907

(22) Filed: Jun. 25, 2013

(65) Prior Publication Data

US 2013/0290616 A1  Oct. 31, 2013

Related U.S. Application Data

(63) Continuation of application No. 12/427,358, filed on Apr. 21, 2009, now Pat. No. 8,493,607.

(30) Foreign Application Priority Data

Apr. 25, 2008 (JP) .................................. 2008-115576
Apr. 9, 2009 (JP) .................................. 2009-094864

(51) Int. Cl.
*G06F 15/00* (2006.01)
*G06K 1/00* (2006.01)
*G06K 15/00* (2006.01)
*G06F 12/02* (2006.01)

(52) U.S. Cl.
CPC .... *G06F 12/0246* (2013.01); *G06F 2212/7211* (2013.01)
USPC ........................................ 358/1.16; 358/1.15

(58) Field of Classification Search
CPC ..................... G06F 12/0246; G06F 2212/7211
USPC ......................................... 358/1.16, 1.15, 1.1
See application file for complete search history.

(56) References Cited

U.S. PATENT DOCUMENTS

| | | | |
|---|---|---|---|
| 6,029,238 A | 2/2000 | Furukawa | |
| 6,196,670 B1 | 3/2001 | Saruta | |
| 6,493,519 B2 * | 12/2002 | Sasame et al. | 399/25 |
| 7,761,014 B2 | 7/2010 | Fukushima | |
| 2004/0160639 A1 | 8/2004 | Furukawa | |
| 2008/0140918 A1 * | 6/2008 | Sutardja | 711/103 |

FOREIGN PATENT DOCUMENTS

| | | |
|---|---|---|
| JP | 5-249769 A | 9/1993 |
| JP | 6-138730 A | 5/1994 |
| JP | 2001-215862 A2 | 8/2001 |
| JP | 2006-056071 A | 3/2006 |

OTHER PUBLICATIONS

Definition, "switchable", Merriam-Webster online Dictionary. Dec. 30, 2013. Screenshot of webpage corresponding to url: http://www.merriam-webster.com/thesaurus/switchable.*

* cited by examiner

*Primary Examiner* — Douglas Tran
(74) *Attorney, Agent, or Firm* — Fitzpatrick, Cella, Harper & Scinto

(57) ABSTRACT

An apparatus has an external memory control apparatus for controlling rewriting of a memory. The external memory control apparatus allows the memory to store the number of formed monochromatic images and changes a rewriting frequency of the memory according to the number of formed monochromatic images.

9 Claims, 9 Drawing Sheets

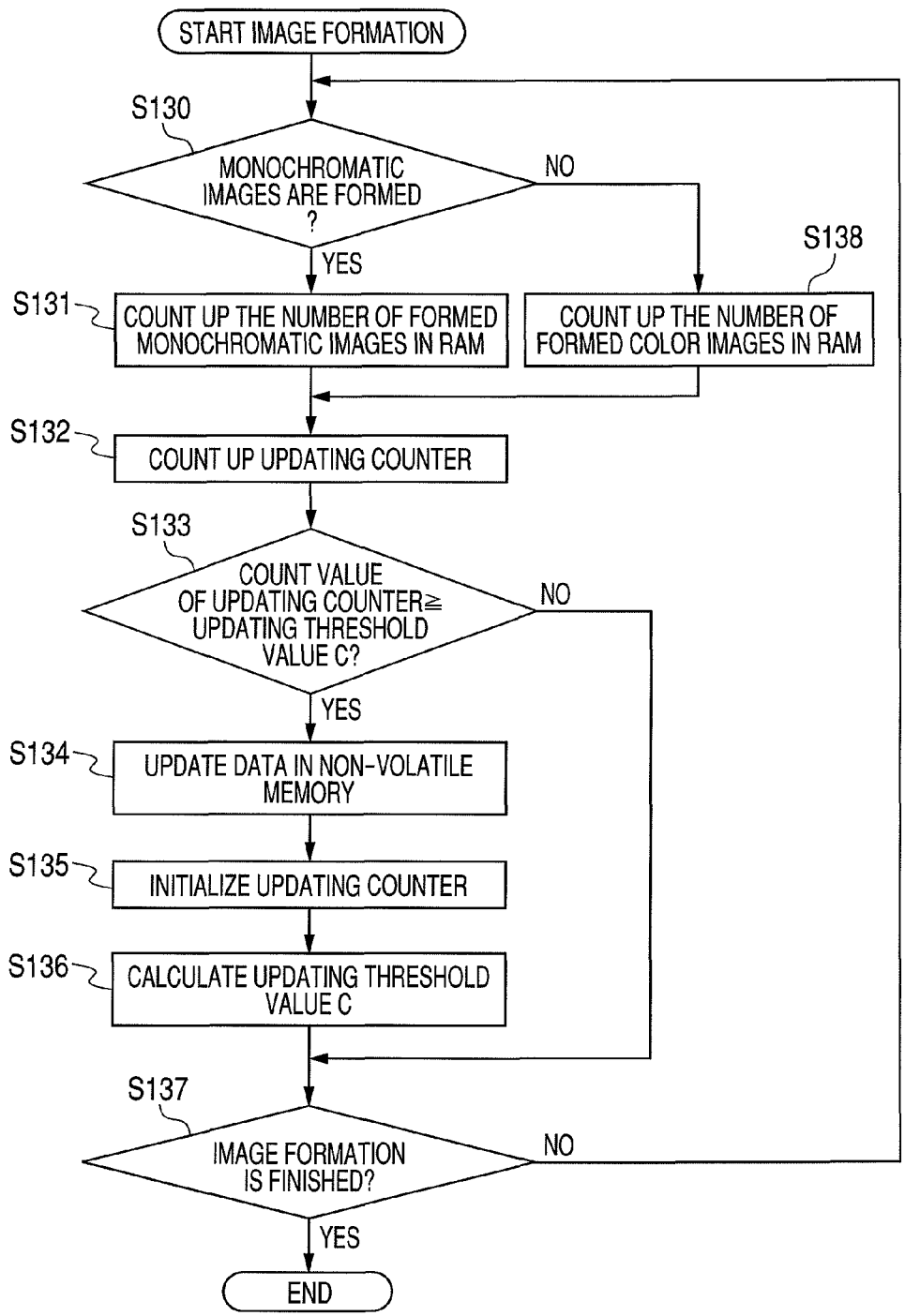

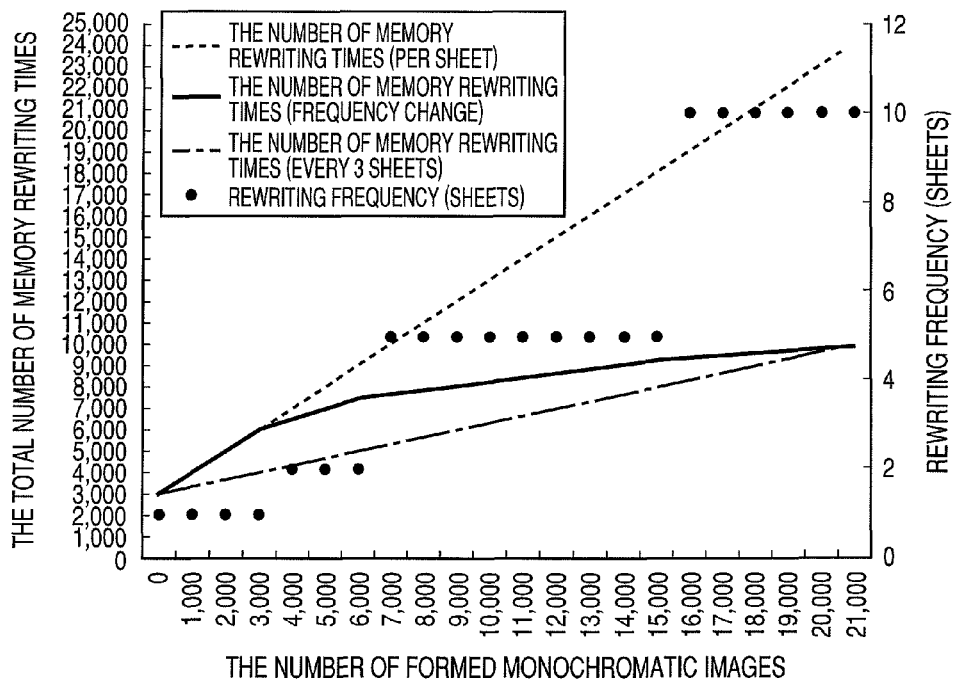

| RATIO OF THE NUMBER OF FORMED MONOCHROMATIC IMAGES TO THE NUMBER OF FORMED COLOR IMAGES | UPDATING THRESHOLD VALUE C | |
| --- | --- | --- |
| | CARTRIDGES FOR FORMING COLOR IMAGES | CARTRIDGE FOR FORMING MONOCHROMATIC IMAGES |
| 0.0 – 2.0 | 1 | 1 |
| 2.1 – 5.0 | 2 | 1 |
| 5.1 – 8.0 | 3 | 1 |
| 8.1 – 10.0 | 4 | 1 |
| 10.1 OR MORE | 5 | 1 |

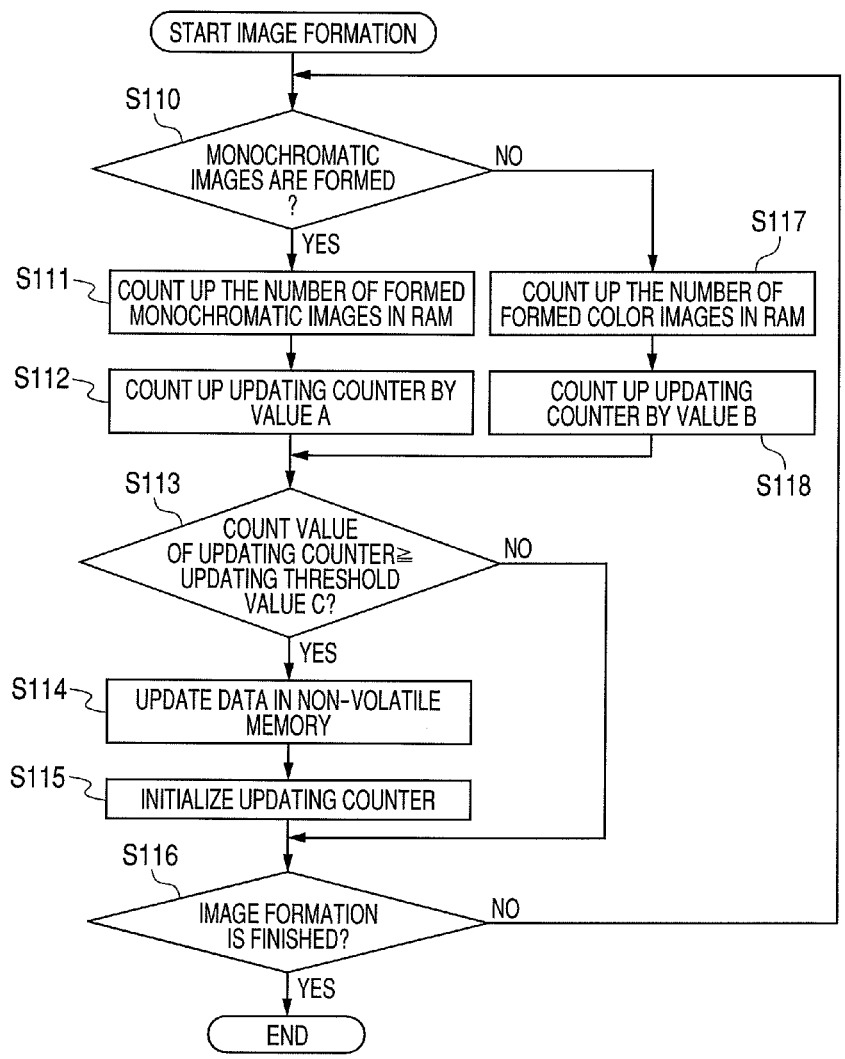

FIG. 14

|  | COUNT-UP AMOUNT A | COUNT-UP AMOUNT B |
|---|---|---|
| PROCESS CARTRIDGES FOR FORMING COLOR IMAGES | 1 | 5 |
| PROCESS CARTRIDGE FOR FORMING MONOCHROMATIC IMAGES | 5 | 5 |

CONTROL APPARATUS OF NON-VOLATILE MEMORY AND IMAGE FORMING APPARATUS

This application is a continuation of U.S. application Ser. No. 12/427,358, filed Apr. 21, 2009 (allowed), the contents of which are incorporated by reference herein.

BACKGROUND OF THE INVENTION

1. Field of the Invention

The present invention relates to a control apparatus of a non-volatile memory which is built in an apparatus and an image forming apparatus and, more particularly, to a control method of a non-volatile memory which is built in, for example, a copying apparatus, a printer, or a facsimile (FAX).

2. Description of the Related Art

Hitherto, for example, in an image forming apparatus, respective items such as the number of prints, using time, and the like are measured and the measured value is stored into a non-volatile memory such as an EEPROM (Electrically Erasable and Programmable ROM). A maintenance such as exchange time, or repair of parts is performed with reference to the stored values. The EEPROM which is used as a non-volatile memory is a device in which the number of rewriting times is limited. The limited number of rewriting times is equal to about 10000 to 100000 times. Therefore, a method of controlling the non-volatile memory so that the number of rewriting times does not exceed such a limited number of rewriting times has been proposed. For example, such control that a plurality of storage areas for storing predetermined data are provided, a pointer to designate the storage area is provided, and when the data in one storage area reaches a predetermined value, the pointer is changed has been proposed (for example, refer to Japanese Patent Application Laid-Open No. H06-138730). A control method whereby timing for rewriting the non-volatile memory is controlled, thereby preventing the number of rewriting times from exceeding the limited number has also been proposed. For example, such control that when a predetermined amount of data is added to the data which is stored into the non-volatile memory, if a power supply to an apparatus main body is turned off, the non-volatile memory is rewritten has been proposed (for example, refer to Japanese Patent Application Laid-Open No. H05-249769).

However, depending on a using state of the user, there is a case where it is difficult to estimate the number of rewriting times of the non-volatile memory. For example, it corresponds to a case in an image forming apparatus in which a plurality of exchangeable cartridges adapted to form images are provided and a non-volatile memory is built in each cartridge. In such an image forming apparatus, it corresponds to a case where when an image formation is executed by using only a specific cartridge, the non-volatile memories built in other cartridges are also rewritten.

In such cases, in spite of a fact that toner consumption amounts of the cartridges which are not used for the image formation are smaller than that of the cartridge used for the image formation, the number of times of the rewriting operation which is executed to the non-volatile memory until the cartridge is exchanged increases. Since a using frequency of each of the cartridges having a possibility that they are not used for the image formation differs depending on the user, it is difficult to estimate the number of rewriting times of the non-volatile memory. The image forming apparatus with such a construction has been proposed in Japanese Patent Application Laid-Open No. 2001-215862. In such a case, in order to assure a reliability of the data which is stored into the non-volatile memory, it is necessary to use a non-volatile memory in which the limited number of rewriting times is larger than the number of rewriting times based on the general using state, or it is necessary to decrease the rewriting frequency so as not to exceed the limited number of rewriting times and use the non-volatile memory. However, there is a possibility that use of the non-volatile memory in which the limited number of rewriting times is large results in increase in costs. If the rewriting frequency is simply decreased, a possibility that the data whose writing is not finished yet is lost due to the attaching/detaching operation of the cartridge, a power-off of the image forming apparatus, or the like increases.

The invention is made by paying attention to such problems and it is an object of the invention to provide a control apparatus of a non-volatile memory and an image forming apparatus, in which a reliability of data which is written into the non-volatile memory does not deteriorate in various using states.

SUMMARY OF THE INVENTION

To solve the above problems, according to the invention, there is provided a control apparatus of a non-volatile memory, comprising: a control unit which controls a rewriting operation of data into the non-volatile memory, wherein the control unit stores information for presuming the number of rewriting times of the data to the non-volatile memory into the non-volatile memory and changes a rewriting frequency of the non-volatile memory according to the information for presuming the number of rewriting times.

According to the invention, there is provided an image forming apparatus comprising: a plurality of image forming units each having a non-volatile memory and configured to execute an image formation; and a control unit configured to control a rewriting operation of each of the non-volatile memories, in which when the image formation is executed by using a specific image forming unit among the plurality of image forming units, information regarding the image formation that is executed by using the specific image forming unit is stored into the non-volatile memories held in the other image forming units which are not used for the image formation, wherein the control unit changes rewriting frequencies of the non-volatile memories in the other image forming units according to the information stored in the non-volatile memories in the other image forming units.

According to the invention, there is also provided an image forming apparatus in which a plurality of cartridges each having a non-volatile memory are detachable, comprising: a first image forming mode for executing an image formation by using a specific cartridge among the plurality of cartridges; and a second image forming mode for executing an image formation by using other cartridges different from the cartridge used in the first image forming mode, wherein when the image formation is executed in the first image forming mode, information regarding a using state of the specific cartridge is stored into the non-volatile memories in the other cartridges, and when the image formation is executed in the second image forming mode, information regarding using states of the other cartridges is stored into the non-volatile memories in the other cartridges, and rewriting frequencies of the non-volatile memories in the other cartridges are changed according to the information regarding the using state of the specific cartridge stored in the non-volatile memory.

Further features of the present invention will become apparent from the following description of exemplary embodiments (with reference to the attached drawings).

BRIEF DESCRIPTION OF THE DRAWINGS

FIG. 7 is a flowchart for control of the non-volatile memory at the time of the image forming operation in each of the embodiments 1 and 2.

FIG. 8 illustrates a control table of the non-volatile memory in the embodiment 1.

FIG. 9 is a graph illustrating the number of rewriting times of the non-volatile memory in the embodiment 1.

FIG. 12 is a flowchart for control of the non-volatile memory when a power source is turned on in the embodiment 3.

FIG. 13 is a flowchart for control of the non-volatile memory at the time of the image forming operation in the embodiment 3.

FIG. 14 illustrates a control table of the non-volatile memory in the embodiment 3.

DESCRIPTION OF THE EMBODIMENTS

Exemplary embodiments of the invention will be illustratively described in detail hereinbelow with reference to the drawings. However, component elements disclosed in the embodiments are merely illustrated as examples and the technical scope of the invention is decided by the scope of claim for a patent and is not limited by the following individual embodiments.

Best modes for carrying out a control apparatus of a non-volatile memory and an image forming apparatus according to the invention will be described further in detail hereinbelow by the embodiments with reference to the drawings.

Figure 1:
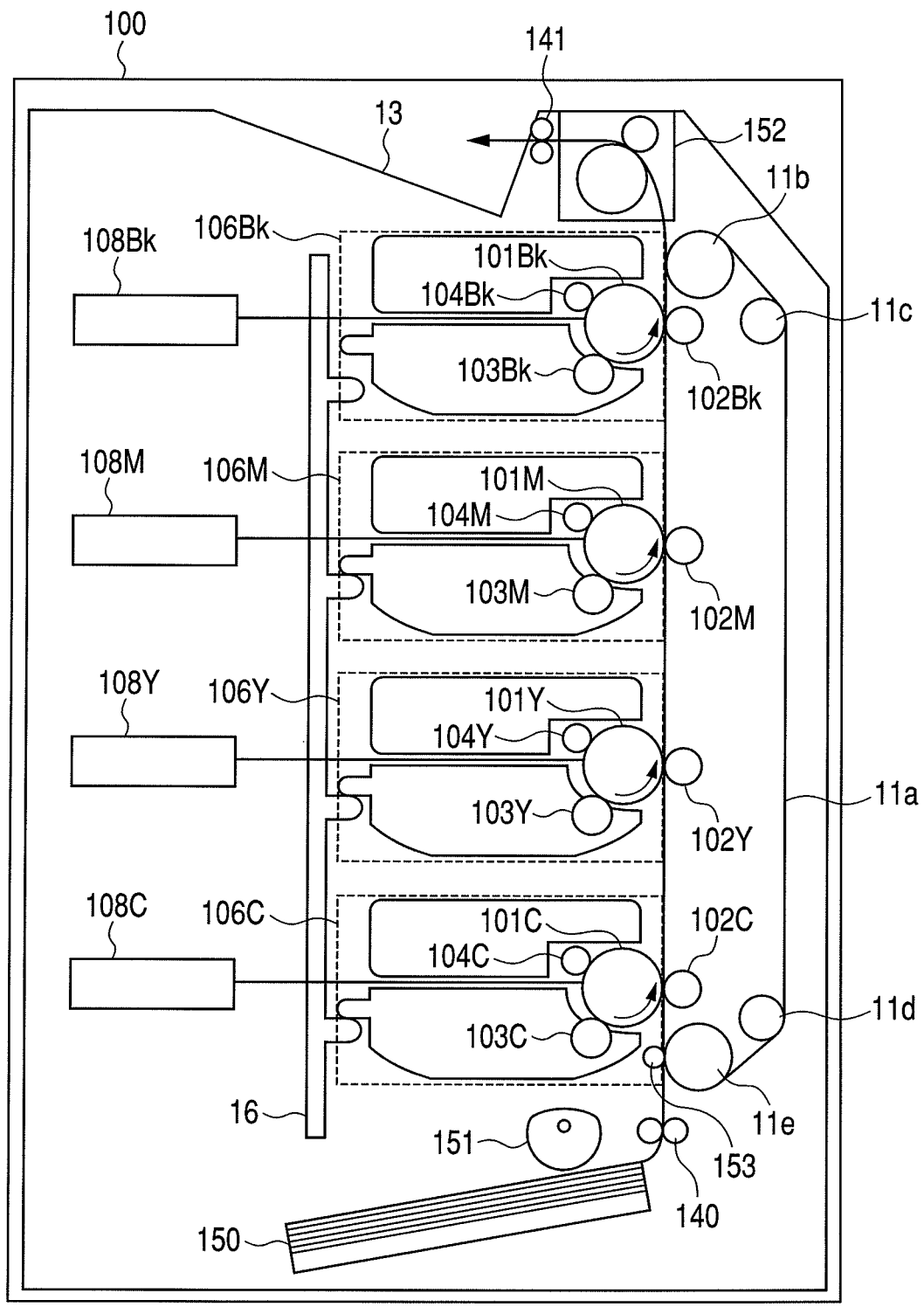
FIG. 1 is a diagram for describing a state in the case of executing a color image formation of an image forming apparatus in each of embodiments 1 to 3.
Figure 2:
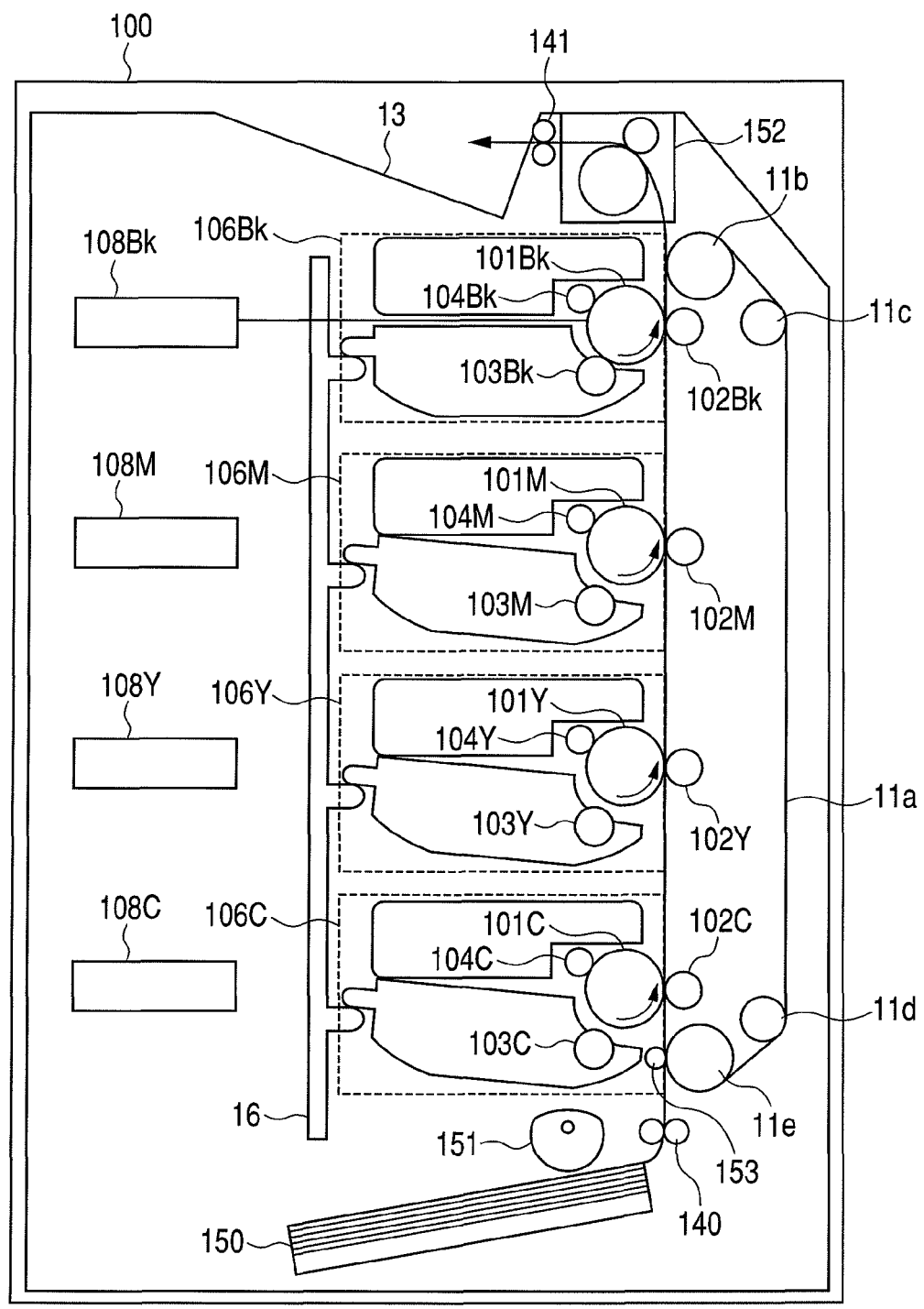
FIG. 2 is a diagram for describing a state in the case of executing a monochromatic image formation of the image forming apparatus in each of the embodiments 1 to 3.

First, an embodiment 1 will be described. FIGS. 1 and 2 are diagrams each for describing a state of the image forming apparatus for controlling the non-volatile memory according to the embodiment 1. FIG. 1 is the state description diagram of the image forming apparatus for executing a color image formation (multicolor image formation). FIG. 2 is the state description diagram of the image forming apparatus for executing a monochromatic image formation (single-color image formation).

Whole Construction

The color image forming apparatus illustrated in FIG. 1 or 2 has four photosensitive drums 101 (101C, 101Y, 101M, 101Bk). Each of the four photosensitive drums 101 is rotated counterclockwise in the diagram by a driving unit such as a driving motor or the like (not shown). The following devices are arranged around each photosensitive drum 101 in order according to its rotating direction. A charging roller 104 (104C, 104Y, 104M, 104Bk) is a charging unit for uniformly charging the surface of the photosensitive drum 101. An exposing apparatus 108 (108C, 108Y, 108M, 108Bk) is an exposing unit for irradiating a laser beam based on image information and forming an electrostatic latent image on the photosensitive drum 101. A developing device 103 (103C, 103Y, 103M, 103Bk) is a developing unit for depositing toner onto the electrostatic latent image, thereby visualizing the image as a toner image. Further, a transfer roller 102 (102C, 102Y, 102M, 102Bk) is a transfer unit for transferring the toner image on the photosensitive drum 101 onto a transfer material. An image forming section as an image forming unit is constructed in this manner. The photosensitive drum 101, charging roller 104, and developing device 103 are integratedly constructed like a cartridge, thereby forming a cartridge 106 (106C, 106Y, 106M, 106Bk).

The transfer material fed from a sheet feed cassette 150 is conveyed to the image forming unit by a conveying belt 11a and the toner images of the respective colors are sequentially transferred onto the transfer material, so that a color image is recorded. After that, the image on the transfer material is fixed by a fixing unit 152 as a fixing device and the resultant transfer material is ejected to an ejecting portion 13 by an ejecting roller pair 141.

Figure 3:
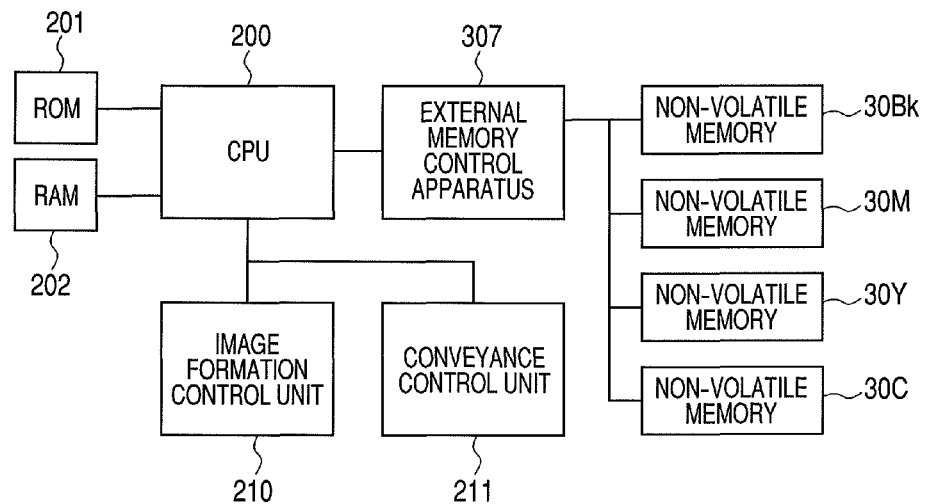
FIG. 3 is a block diagram illustrating a construction of the image forming apparatus in each of the embodiments 1 to 3.

FIG. 3 illustrates a block diagram illustrating a construction of an image forming apparatus 100. A CPU 200 reads out a program stored in a ROM 201 and controls an image formation control unit 210 and a conveyance control unit 211, which will be described hereinafter, thereby executing the image forming operation. A construction of each unit/portion will be sequentially described.

Construction of Image Formation Unit

Each photosensitive drum 101 as an image holding member is formed by coating an outer circumferential surface of a cylinder having a diameter of 30 mm and made of aluminum with an organic photoconductive layer (OPC). Both edge portions of the photosensitive drum 101 are rotatably supported by flanges. By propagating a driving force to one of the edge portions from a driving motor (not shown), the photosensitive drum is rotated counterclockwise in the diagram.

The charging roller 104 is a conductive roller formed in a roller shape. By allowing the roller to be come into contact with the surface of the photosensitive drum 101 and applying a charging bias voltage by a power source (not shown), the surface of the photosensitive drum 101 is uniformly charged.

The exposing apparatus 108 irradiates the laser beam by a driving circuit (not shown) based on the image information, thereby forming the electrostatic latent image onto the photosensitive drum 101.

The developing device 103 is located in a toner enclosing portion in which toner of each color of black (Bk), cyan (C), magenta (M), and yellow (Y) has been enclosed, is adjacent to the surface of the photosensitive drum 101, and is rotated by a driving unit (not shown). In addition to it, by applying a developing bias voltage by a developing bias power source (not shown), the toner image is developed. The toner of the respective colors of cyan, yellow, magenta, and black have been enclosed in the toner enclosing portion in order from the upstream side in the conveying direction of the transfer material.

The transfer rollers 102C, 102Y, 102M, and 102Bk which are in contact with the conveying belt 11a are juxtaposed with the inside of the conveying belt 11a in correspondence to the four photosensitive drums 101C, 101Y, 101M, and 101Bk, respectively. Those transfer rollers 102 are connected by a power source for a transfer bias (not shown) and charges of the positive polarity are applied to the transfer material from the transfer rollers 102 through the conveying belt 11a. By such an electric field, the toner images of the negative polarity on the photosensitive drums 101 are sequentially transferred onto the transfer material which is in contact with the photosensitive drum 101, so that a color image is formed.

When the toner image transferred onto the transfer material passes through the fixing unit 152 constructed by a heating roller which drives and rotates and a pressing roller which is driven and rotated, a heat and a pressure are applied to the toner image, so that the toner image is fixed.

Construction of Conveying Unit

After the transfer material was fed from the feeding unit, it is conveyed to the image forming unit by the conveying belt 11a. In the sheet feeding unit, a plurality of transfer materials are enclosed in the sheet feed cassette 150 and a half-moon shaped pickup roller 151 for picking up the transfer materials one by one is rotatably arranged near the sheet feed cassette 150. The transfer material which was picked up by an intermittent rotation of the pickup roller 151 is fed to the conveying belt 11a by a feed roller pair 140.

The conveying belt 11a serving as a transfer material holding member constructing a conveying unit is suspended and supported by four rollers, that is, a driving roller 11b and driven rollers 11c, 11d, and 11e and is arranged in opposition to all of the photosensitive drums 101C, 101Y, 101M, and 101Bk. Generally, the conveying belt 11a is made of an endless film-shaped member having a thickness of 100 to 150 μm and a volume specific resistance of $10^{10}$ to $10^{14}$ Ω·cm. The conveying belt 11a is circulated and moved by the driving roller 11b so as to electrostatically adsorb the transfer material onto an outer circumferential surface in opposition to the photosensitive drum 101, thereby allowing the transfer material to be come into contact with the photosensitive drum 101. Thus, the transfer material is conveyed to the transfer position by the conveying belt 11a and the toner image on the photosensitive drum 101 is transferred onto the transfer material.

An adsorbing roller 153 for sandwiching the transfer material together with the conveying belt 11a and allowing the transfer material to be adsorbed to the conveying belt 11a is arranged at the upstream-most position of the conveying belt 11a. Upon conveying the transfer material, by applying a bias voltage to the adsorbing roller 153, an electric field is formed between the conveying belt 11a and the facing adsorbing roller 153 connected to the ground and a dielectric polarization is caused between the conveying belt 11a and the transfer material, thereby causing an electrostatic adsorbing force therebetween.

Construction when a Color Image is Formed and Construction when a Monochromatic Image is Formed The operations in the case of forming a color image and forming a monochromatic image will now be described.

In the case of forming the color image, the photosensitive drums 101 of all of the four colors and the developing devices 103 are moved by a development separating plate 16 to positions where they are come into contact with each other and the toner images are formed onto the photosensitive drums 101 of all of the four colors.

In the case of forming the monochromatic image, the image formation is executed by using only the cartridge 106Bk in order to reduce a deterioration in performance of the cartridges 106C, 106Y, and 106M which are unnecessary for the image formation. Therefore, when the monochromatic image is formed, as illustrated in FIG. 2, only the photosensitive drum 101Bk and the developing device 103Bk are moved by the development separating plate 16 so that they are come into contact with each other. Thus, the toner image is formed onto the photosensitive drum 101Bk. After that, the images formed on the photosensitive drums 101 are transferred onto the transfer material by the transfer rollers 102 and the color image and the monochromatic image are fixed by the fixing unit 152.

Constructions of Cartridge and Non-Volatile Memory

Figure 4:
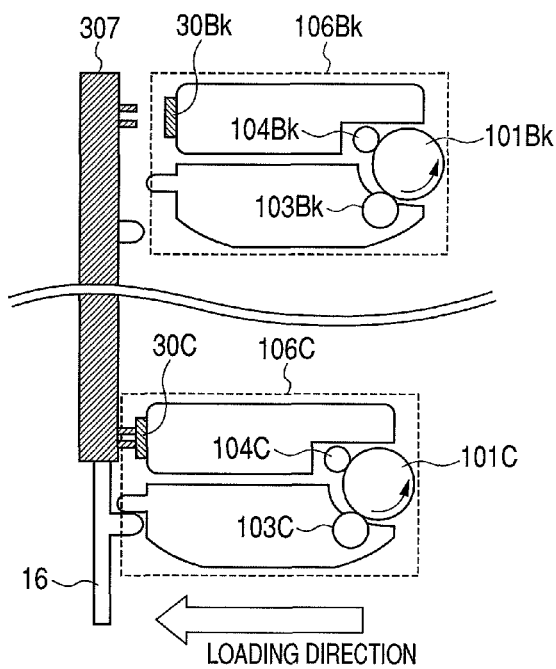
FIG. 4 is a diagram for describing cartridges, non-volatile memories, and an external memory control apparatus in each of the embodiments 1 to 3.

FIG. 4 is a diagram illustrating a state where the cartridge 106 has been attached into the image forming apparatus 100. A non-volatile memory 30 (hereinbelow, simply referred to as a memory 30) is built in the cartridge 106 (the cartridges 106 of the respective colors have memories 30Bk, 30M, 30Y, and 30C, respectively). When the cartridge 106 is attached into the image forming apparatus 100, the memory 30 is connected to an external memory control apparatus 307 (control unit) of the image forming apparatus 100. The memory 30 has a non-volatile storing element therein. In response to an instruction from the CPU 200, data is written and read out into/from the memory 30 by the external memory control apparatus 307.

Figure 5:
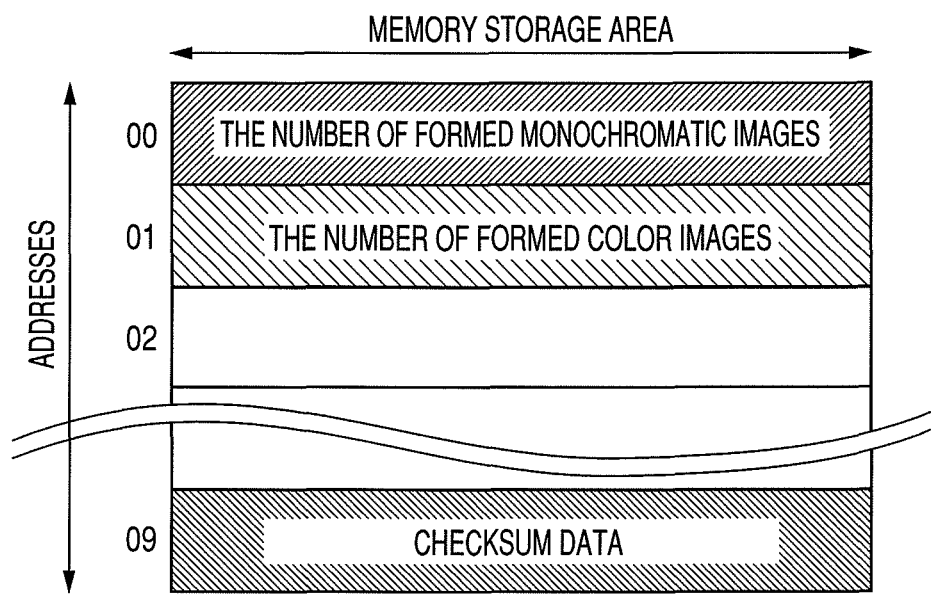
FIG. 5 is a diagram illustrating a data structure in the non-volatile memory in each of the embodiments 1 to 3.

FIG. 5 illustrates a data structure in the memory 30. In memory storage areas in the memories 30 of the cartridges 106 of four colors, the number of formed monochromatic images (the number of formed mono images) is stored in address 00, the number of formed color images is stored in address 01, and other data is stored in addresses 02 to 08, respectively. The number of formed monochromatic images is an example of information showing a using state of the cartridge 106Bk in the case where the image formation is performed by using only the cartridge 106Bk. The number of formed color images is an example of information showing a using state of the cartridge 106M, 106Y, or 106C in the case where the image formation is performed by using any one of the cartridges 106M, 106Y, and 106C. As information regarding the using state, besides the number of formed images, for example, using time information (driving time information) of each member constructing the cartridge may be used. Checksum information (checksum data) for error detection of values in addresses 00 to 08 is stored in address 09. The number of formed monochromatic images is equal to the total number of monochromatic image forming times. The number of formed monochromatic images is stored one sheet by one into the memory 30 of each color. The number of formed color images is equal to the total number of color image forming times. The number of formed color images is stored one sheet by one into the memory 30 of each color. The checksum information stores a total value of the data in addresses 00 to 08 and is used to discriminate about the validity of the data in addresses 00 to 08. Therefore, in the case of rewriting any one of addresses 00 to 08, it is necessary to rewrite the checksum information in address 09. That is, the total number of rewriting times of the data in addresses 00 to 08 is equal to the number of rewriting times of address 09.

It is necessary to control the number of rewriting times of address 09 so that it is equal to or less than the limited number of rewriting times of the memory 30. In the embodiment, a description is made on the assumption that the limited number of rewriting times of the memory 30 is equal to 10000 times and the number of sheets which can be printed by the cartridge 106 is equal to 3000.

The cartridges 106C, 106M, and 106Y are the cartridges which are used when the color image is formed. Therefore, when a count value of the number of formed color images is equal to 3000 or more, it is determined that a service life of the cartridge has expired. The image forming operation is stopped and the user is requested to exchange the cartridge 106. The cartridge 106Bk is the cartridge which is used when the color image is formed and when the monochromatic image is formed. Therefore, when a total count value of the number of formed color images and the number of formed monochromatic images is equal to 3000 or more, it is determined that a service life of the cartridge has expired. The image forming operation is stopped and the user is requested to exchange the cartridge. In the case of forming the monochromatic image, although the number of sheets which can be printed by the cartridge 106 for executing the color image formation does not decrease, it is necessary to rewrite the number of formed monochromatic images. Consequently, the number of rewriting times of the memory 30 (30C, 30M, 30Y) of the cartridge 106 (106C, 106M, 106Y) for executing the color image formation changes according to a using situation of the monochromatic image formation. In the embodiment, a description is made on the assumption that the rewriting is not executed to addresses 02 to 08 in the memory 30.

Control Method of Non-Volatile Memory

Figure 6:
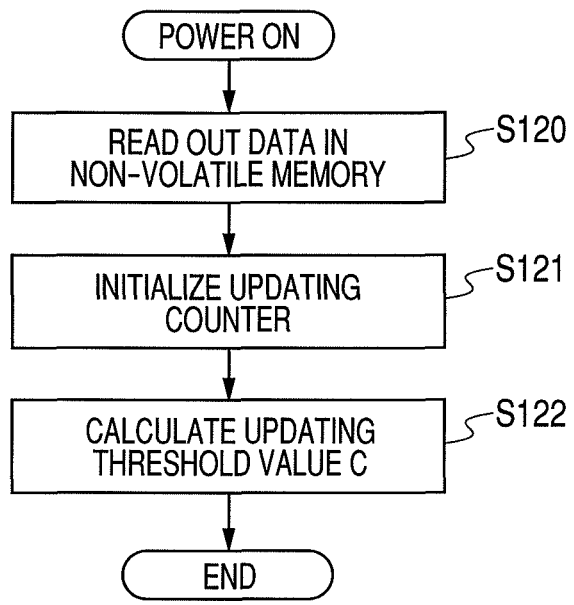
FIG. 6 is a flowchart for control of the non-volatile memory when a power source is turned on in each of the embodiments 1 and 2.

Subsequently, a control method of the non-volatile memory as a feature of the invention will be described with reference to flowcharts of FIGS. 6 and 7. FIG. 6 is the flowchart regarding the non-volatile memory control when the power source of the image forming apparatus is ON. FIG. 7 is the flowchart regarding the non-volatile memory control when the image forming operation is executed. The non-volatile memory control denotes control of the data rewriting operation into the non-volatile memory.

With Respect to Control of Non-Volatile Memory at the Time of Power-ON of Image Forming Apparatus First, the non-volatile memory control when the power source of the image forming apparatus 100 is ON will be described with reference to FIG. 6.

When the power source is turned on, the CPU 200 reads out the number of formed monochromatic images and the number of formed color images stored in the memories 30 and stores the read-out results into a RAM 202 (refer to FIG. 3), respectively (step 120; hereinbelow, referred to as S120). Subsequently, a value of a counter for deciding timing for updating each memory 30 (hereinbelow, referred to as an updating counter; the value is counted in each cartridge) is initialized to zero (S121). Subsequently, an updating threshold value C (held in each cartridge) adapted to be compared with the count value of the updating counter mentioned above is calculated by using a table of FIG. 8 in order to discriminate whether or not each memory 30 is updated (S122).

FIG. 8 illustrates the table for obtaining the updating threshold value C which is used according to the number of formed monochromatic images (information by which the number of rewriting times can be presumed). When the number of formed monochromatic images is equal to 3000 or less, the updating threshold value C of the memory 30 (30C, 30M, 30Y) of the cartridge for the color image formation is equal to 1 (C=1) and the updating threshold value C of the memory 30 (30Bk) of the cartridge for the monochromatic image formation is equal to 1 (C=1). When the number of formed monochromatic images lies within a range of 3001 to 6000, the updating threshold value C of the memory 30 of the cartridge for executing the color image formation is equal to 2 (C=2) and the updating threshold value C of the memory 30 of the cartridge for executing the monochromatic image formation is equal to 1 (C=1). That is, at a point of time when the number of formed monochromatic images reaches 3001 or more (predetermined number of times or more), the updating threshold value C is changed. In the case of the subsequent number of sheets, the updating threshold value C is also obtained in a manner similar to that mentioned above.

With Respect to Control of Non-Volatile Memory when the Image Forming Operation is Executed Subsequently, the non-volatile memory control at the time of the image formation will be described with reference to FIG. 7.

First, whether the monochromatic image formation is executed or the color image formation is executed is discriminated (S130). In the case of executing the monochromatic image formation, the number of formed monochromatic images for each cartridge stored in the RAM 202 is counted up by 1 (S131). In the case of executing the color image formation, the number of formed color images for each cartridge stored in the RAM 202 is counted up by 1 (S138). Subsequently, the count value of the updating counter is counted up by 1 (S132). Then, the count value of the updating counter corresponding to the memory 30 of each cartridge 106 is compared with the updating threshold value C corresponding to each cartridge (S133). If it is decided that the count value of the updating counter is equal to the updating threshold value C or more, the value of the number of formed monochromatic images and the value of the number of formed color images stored in the RAM 202 are written into the memory 30 and rewritten (S134). The updating counter is initialized to 0 (S135). The updating threshold value C is calculated again from the number of formed monochromatic images by using the table of FIG. 8 (S136). When the count value of the updating counter is less than the updating threshold value C, no process is executed. The above operation is repeated until the formation of all images is finished (S137).

Processes in S133 and subsequent steps will now be described in a state where the number of formed monochromatic images is equal to, for example, about 4000. In this case, it will be understood from the table of FIG. 8 that the updating threshold value C for the cartridges 106C, 106M, and 106Y for the color image formation is equal to 2 (C=2) and the updating threshold value C for the cartridge 106Bk for the monochromatic image formation is equal to 1 (C=1). Now, assuming that the count value of the updating counter is equal to 1 as a result of that the updating counter was counted up in S132, the count value of the updating counter is less than the updating threshold value C for the cartridges 106C, 106M, and 106Y for the color image formation in S133, so that the processing routine advances to S137. On the other hand, the count value of the updating counter is equal to the updating threshold value C or more for the cartridge 106Bk for the monochromatic image formation in S133, so that the processing routine advances to S134 and subsequent processes. That is, the updating is executed only for the memory 30Bk in S134. The updating counter for the cartridge 106Bk for the monochromatic image formation is initialized in S135. The count value of the updating counter for the cartridge 106Bk for the monochromatic image formation which is calculated in S136 is equal to (C=1).

When the image formation is continued and the process of S133 is subsequently executed, the count value of the updating counter is equal to 2 (C=2) for the cartridges 106C, 106M, and 106Y for the color image formation as a result of that the updating counter was counted up in S132. On the other hand, the count value of the updating counter is equal to 1 for the cartridge 106Bk for the monochromatic image formation because the updating counter has been initialized in S135. In this case, in both of the cartridges 106C, 106M, and 106Y for the color image formation and the cartridge 106Bk for the monochromatic image formation, the count value of each updating counter is equal to each updating threshold value C or more in S133. Therefore, the memories 30C, 30M, 30Y, and 30Bk are updated in S134.

As mentioned above, when the number of formed monochromatic images is equal to about 4000, a rewriting frequency of the memories 30C, 30M, and 30Y is equal to once per two images and is smaller than a rewriting frequency (every image) of the memory 30Bk.

By the above control, by increasing the number of images of the updating threshold value C with an increase in the number of formed monochromatic images, an updating frequency of the memory 30 of the cartridge 106 for the color image formation is reduced.

Comparison with Related Art

FIG. 9 illustrates comparison results of the number of memory rewriting times (shown by a solid line in the diagram) in the case where the updating frequency (shown by black dots in the diagram) of the memory 30 is changed based on the number of formed monochromatic images in the invention and the number of memory rewriting times by an updating method of another memory M. As an updating method of another memory M to be compared, the rewriting of every image in which the rewriting frequency is highest (shown by a broken line in the diagram) and the number of rewriting times based on the rewriting frequency of every three images (shown by an alternate long and short dash line in the diagram) are illustrated.

The number of rewriting times illustrated in FIG. 9 is an estimation value of the number of rewriting times for the cartridge 106 for the color image formation and indicates a value including the maximum value (3000 times) of the number of rewriting times of the memory 30 for printing 3000 images corresponding to the number of color images which can be formed. The method of rewriting every image in which the rewriting frequency is highest is control that is effective to a data loss in the case where the attachment/detachment of the cartridge, the power-off of the image forming apparatus main body, or the like has occurred before the data in the RAM 202 is written into the non-volatile memory. However, at a point of time when 7000 monochromatic images have been formed, the number of rewriting times reaches the limited number of rewriting times of the memory M. According to the method of rewriting every three images, as compared with the method of rewriting every image, although the rewriting of the memory 30 due to the monochromatic image formation of the number which is about three times as large as the number in the case of the method of rewriting every image can be performed, it is disadvantageous to the data loss in the foregoing example. According to the method of the invention, the rewriting of the memory 30 is executed every image until the number of formed monochromatic images reaches the predetermined number and the rewriting frequency of the memory 30 is reduced with an increase in the number of formed monochromatic images. By this method, when the monochromatic image formation which is presumed to be a general using situation is executed, the data loss is prevented as much as possible and the number of rewriting times of the memory 30 of the cartridge 106 for the color image formation can be suppressed even for the user who often executes the monochromatic image formation.

As for the memory 30Bk of the cartridge 106Bk for executing the monochromatic image formation, even when it is used for any of the color image formation and the monochromatic image formation, even if the memory 30Bk is updated each time one sheet of image is formed, the number of rewriting times does not exceed the limited number of rewriting times. This is because the limited number of rewriting times of the memory 30Bk is larger than the number of sheets which can be printed by the cartridge. Therefore, all of the updating threshold values C for the cartridge for the monochromatic image formation in the table of FIG. 8 are set to 1 and the value in which the data loss is small is used.

In the control method of the non-volatile memory described above, the number of rewriting times of the non-volatile memory is discriminated from the number of formed monochromatic images and the rewriting frequency is changed with an increase in the number of rewriting times. Thus, the rewriting frequency of the non-volatile memory according to the using situation of the user can be used. The non-volatile memory control in which the deterioration of the reliability of the data is suppressed can be realized.

Subsequently, an embodiment 2 will be described. The system construction of the image forming apparatus described in the embodiment 1 with reference to FIGS. 1 to 5 is also used in the embodiment 2. Therefore, in a description of the image forming apparatus and the image forming operation of the image forming apparatus, the description of the embodiment 1 is also used and the overlapped description is omitted here. Since FIGS. 6 and 7 are also used with respect to a control flow of the non-volatile memory, its description is omitted here.

In the embodiment 1, the method whereby the updating threshold value C is obtained by the table of FIG. 8 according to the number of formed monochromatic images and the updating frequency of the non-volatile memory is changed has been described. In the embodiment 2, a control method of the non-volatile memory in the case where the updating threshold value C is obtained by a table illustrated in FIG. 10 in place of FIG. 8 will be described.

Control Method of Non-Volatile Memory

Table for Obtaining Updating Threshold Value C in the Embodiment 2

Figures 10, 11:
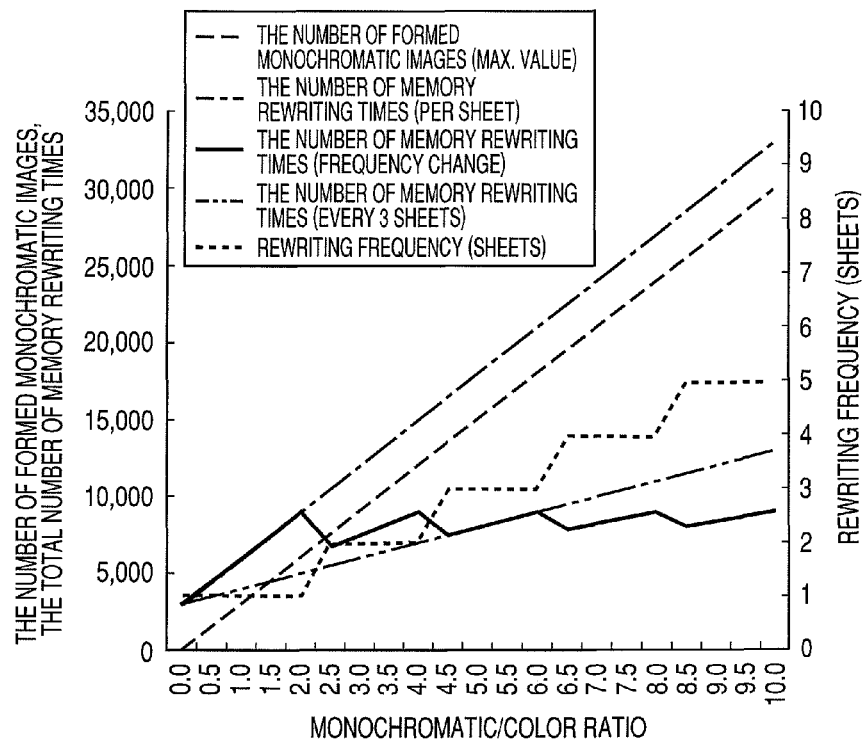
FIG. 10 illustrates a control table of the non-volatile memory in the embodiment 2.
FIG. 11 is a graph illustrating the number of rewriting times of the non-volatile memory in the embodiment 2.

As described in the embodiment 1, the updating threshold value C is obtained by the table illustrated in FIG. 10 in the calculation of the updating threshold value C at the time of power-ON (S122) (flowchart of FIG. 6) and the calculation of the updating threshold value C at the time of the image formation (S136) (flowchart of FIG. 7). FIG. 10 illustrates the table in which the updating threshold value C is selected according to a ratio of the number of formed monochromatic images when the monochromatic image formation is executed (first image forming mode) and the number of formed color images when the color image formation is executed (second image forming mode). When the ratio of the number of formed monochromatic images to the number of formed color images lies within a range from 0 time to 2 times or less, the memory 30 of the cartridge for the color image formation selects the updating threshold value (C=1). When the ratio lies within a range from 2 times to 5 times or less, the memory 30 of the cartridge for the color image formation selects the updating threshold value C=2. That is, when the ratio of the number of formed monochromatic images to the number of formed color images is equal to 2 times or more (predetermined value or more), the updating threshold value C is changed. In the case of the subsequent magnitude, the updating threshold value C is also similarly obtained. In the case of the memory 30 of the cartridge for the monochromatic image formation, in any of those ratios, the updating threshold value C is equal to 1 (C=1).

By the above control, by increasing the number of sheets of the updating threshold value C according to an increase in magnitude of the number of formed monochromatic images to the number of formed color images, the updating frequency of the memory 30 of the cartridge 106 for the color image formation is reduced.

Comparison with Related Art

FIG. 11 illustrates comparison results of the number of memory rewriting times (shown by a solid line in the diagram) in the case where the updating frequency (shown by black dots in the diagram) of the memory 30 is changed based on the ratio of the number of formed monochromatic images and the number of formed color images in the invention and the number of rewriting times by the updating method of another memory M. As an updating method of another memory M to be compared, the rewriting of every image in which the rewriting frequency is highest (shown by an alternate long and short dash line in the diagram) and the number of rewriting times based on the rewriting frequency of every three images (shown by an alternate long and two short dashes line in the diagram) are illustrated. The maximum value of the number of formed monochromatic images is shown by a broken line.

The number of rewriting times illustrated in FIG. 11 is an estimation value of the number of rewriting times for the cartridge 106 for the color image formation and indicates a value including the maximum value (3000 times) of the number of rewriting times of the memory 30 for printing 3000 images corresponding to the number of color images which can be formed. The method of rewriting every image in which the rewriting frequency is highest is control that is effective to the data loss in the case where the attachment/detachment of the cartridge, the power-off of the image forming apparatus main body, or the like has occurred before the data in the RAM 202 is written into the non-volatile memory. However, at a point of time when 7000 monochromatic images have been formed, the number of rewriting times reaches the limited number of rewriting times of the memory M. According to the method of rewriting every three images, as compared with the method of rewriting every image, although the rewriting of the memory 30 due to the monochromatic image formation of the number which is about three times as large as the number in the case of the method of rewriting every image can be performed, it is disadvantageous to the data loss in the foregoing example. According to the method of the invention, the rewriting of the memory 30 is executed every image until the ratio of the number of formed monochromatic images to the number of formed color images reaches the predetermined number and the rewriting frequency of the memory 30 is reduced with an increase in the radio. By this method, when the monochromatic image formation which is presumed to be a general using situation is executed, the data loss is prevented as much as possible and the number of rewriting times of the memory 30 of the cartridge 106 for the color image formation can be suppressed even for the user who often executes the monochromatic image formation.

As for the memory 30Bk of the cartridge 106Bk for executing the monochromatic image formation, even when it is used for any of the color image formation and the monochromatic image formation, even if the memory 30Bk is updated each time one sheet of image is formed, the number of rewriting times does not exceed the limited number of rewriting times. This is because the limited number of rewriting times of the memory 30Bk is larger than the number of sheets which can be printed by the cartridge. Therefore, all of the updating threshold values C for the monochromatic image formation in the table of FIG. 10 are set to 1 and the value in which the data loss is small is used.

In the control method of the non-volatile memory described above, the number of rewriting times of the non-volatile memory is discriminated from the number of formed monochromatic images and the number of formed color images and the rewriting frequency is changed according to the ratio of the number of formed monochromatic images and the number of formed color images. Thus, the rewriting frequency of the non-volatile memory according to the using situation of the user can be used. The non-volatile memory control in which the deterioration of the reliability of the data is suppressed can be realized.

Subsequently, an embodiment 3 will be described. The system construction of the image forming apparatus described in the embodiment 1 with reference to FIGS. 1 to 5 is also used in the embodiment 3. Therefore, in a description of the image forming apparatus and the image forming operation of the image forming apparatus, the description of the embodiment 1 is also used and the overlapped description is omitted here.

Subsequently, a control method of the non-volatile memory as a feature of the invention will be described with reference to flowcharts of FIGS. 12 and 13. FIG. 12 is the flowchart regarding the non-volatile memory control when the power source of the image forming apparatus is ON. FIG. 13 is the flowchart regarding the non-volatile memory control when the image forming operation is executed.

Control Method of Non-Volatile Memory

With Respect to Control of Non-Volatile Memory at the Time of Power-ON of Image Forming Apparatus First, the non-volatile memory control when the power source of the image forming apparatus is ON will be described with reference to FIG. 12.

When the power source is turned on, the CPU 200 reads out the number of formed monochromatic images and the number of formed color images stored in each memory 30 and stores the read-out results into the RAM 202, respectively (S100). Subsequently, the value of the counter for deciding the timing for updating each memory 30 (hereinbelow, referred to as an updating counter; the value is counted in each cartridge) is initialized to 0 (S101).

With Respect to Control of Non-Volatile Memory when the Image Forming Operation is Executed Subsequently, the non-volatile memory control at the time of the image formation will be described with reference to FIG. 13.

First, whether the monochromatic image formation is executed or the color image formation is executed is discriminated (S110). In the case of executing the monochromatic image formation (single-color image forming mode), the number of formed monochromatic images for each cartridge stored in the RAM 202 is counted up by 1 (S111). Subsequently, the count value of the foregoing updating counter is counted up by a value A (S112). In the case of executing the color image formation (multicolor image forming mode), the number of formed color images stored in the RAM 202 is counted up by 1 (S117). Subsequently, the count value of the updating counter is counted up by a value B (S118).

In the embodiment, values in the table illustrated in FIG. 14 are used as values A and B. "5" is used as count-up amount values A and B for the memory 30Bk of the cartridge 106Bk for performing the monochromatic image formation. The count-up amount value A=1 and the count-up amount value B=5 are used for the memories 30C, 30Y, and 30M of the cartridges 106C, 106Y, and 106M for performing the color image formation. Subsequently, the updating threshold value C which is used to discriminate whether or not each memory 30 is updated is compared with the count value of the updating counter (S113). In the embodiment, it is assumed that C=5. If it is decided that the count value of the updating counter is equal to the updating threshold value C or more, the memory is rewritten by the value (predetermined information) stored in the RAM 202 (S114). The updating counter is initialized to 0 (S115). When the count value of the updating counter is less than the updating threshold value C, no process is executed. The above operation is repeated until the formation of all images is finished (S116).

A description will be made here by using specific values. It is assumed that the image forming operation has been started in a state where all of the updating counters were initialized. In the case of executing the monochromatic image formation in S110, A=5 is selected for the cartridge 106Bk for the monochromatic image formation and A=1 is selected for the cartridges 106C, 106M, and 106Y for the color image formation from FIG. 14. Therefore, in S112, the count value of the updating counter for the cartridge 106Bk for the monochromatic image formation is equal to 5 and the count values of the updating counters for the cartridges 106C, 106M, and 106Y for the color image formation are equal to 1. Subsequently, in the discrimination of S113, the count value of the updating counter in the cartridge 106Bk for the monochromatic image formation is equal to the updating threshold value C (=5) or more. The rewriting and updating of the memory 30Bk are executed in S114 and the updating counter is initialized in S115. In the cartridges 106C, 106M, and 106Y for the color image formation, since the count value of the updating counter is less than the updating threshold value C, the rewriting and updating of the memories 30C, 30Y, and 30M are not executed and the processing routine advances to a process of S116. After that, it is assumed that the monochromatic image formation is continuously executed. Thus, the updating counters of the cartridges 106C, 106M, and 106Y for the color image formation are counted up by 1 (=A). When they reach 5, the rewriting and updating of the memories 30C, 30M, and 30Y are executed.

As mentioned above, in the case of executing the monochromatic image formation, the rewriting frequency of each of the memories 30C, 30M, and 30Y is equal to once per five images and is smaller than the rewriting frequency of the memory 30Bk (every image).

In the case of executing the color image formation in S110, the count-up amounts for both of the cartridge 106Bk for the monochromatic image formation and the cartridges 106C, 106M, and 106Y for the color image formation are equal to 5 (B=5) from FIG. 14. Therefore, since the values of the updating counters are equal to the updating threshold value C (=5) or more in S113, the rewriting and updating are executed for all of the memories 30C, 30Y, 30M, and 30Bk.

By the above control, by using the count-up amount values A and B and the updating threshold value C which were used in the embodiment, for the cartridges for executing the color image formation, the value of the memory 30 is updated each time one image is formed in the case of performing the color image formation. On the other hand, the case of performing the monochromatic image formation, the value of the memory is updated each time five images are formed. For the cartridge for executing the monochromatic image formation, the value of the memory 30 is updated each time one image is formed in any of the color image formation and the monochromatic image formation. Thus, in the memory 30 of each cartridge for executing the color image formation, for 7000 times obtained by subtracting 3000 times necessary to rewrite the number of printable sheets due to the color image formation from 10000 times as the limited number of rewriting times, the number of images due to the monochromatic image formation is rewritten at a ratio of once per five images. Therefore, the reliability of the data can be held until about 35000 monochromatic images are formed. In the case of performing the color image formation, since the limited number of rewriting times of the memory 30 is larger than the number of printable sheets of the cartridge, the number of rewriting times does not exceed the limited number of rewriting times. In the case of the memory 30Bk of the cartridge for executing the monochromatic image formation, the limited number of rewriting times of the memory is larger than the number of printable sheets of the cartridge. Therefore, in any one of the color image formation and the monochromatic image formation, even if the memory 30Bk is updated each time one image is formed, the number of rewriting times does not exceed the limited number of rewriting times.

By the above control, the rewriting frequency of the non-volatile memory is changed depending on the case of the monochromatic image formation and the case of the color image formation. Consequently, the following processes can be realized as compared with the case where the rewriting frequency of the memory 30 of each cartridge for executing the color image formation is uniformly decreased from the number of formed monochromatic images which is presumed to be a general using situation (for example, such control that all of the non-volatile memories are updated at a ratio of once per five images, or the like). That is, such a situation that before the data in the RAM 202 is written into the non-volatile memory, the data is lost due to the attaching/detaching operation of the cartridge, the power-off of the image forming apparatus main body, or the like can be reduced. The reliability of the non-volatile memories of the cartridges for the color image formation can be maintained even for the user who often executes the monochromatic image formation. The count-up amount values A and B and the updating threshold value C used in the embodiment are shown as an example and the invention is not limited to those values.

In the embodiments 1 to 3, the number of formed images is stored into the non-volatile memory and the control method of the non-volatile memory according to the number of formed images has been shown. Naturally, the invention is not limited to the number of formed images. For example, similar effects can be also obtained in such a construction that a driving time of the apparatus, the number of on/off times of a clutch or the like, or the like is stored. For example, similar effects can be also obtained in such a construction that the number of rewriting times of the non-volatile memory is discriminated by the driving time, the number of driving times, or the like and a frequency of the updating process of the non-volatile memory is changed.

In the invention, a storing medium in which program codes of software for realizing the functions of the embodiments have been recorded is provided for a system or an apparatus. The functions of the embodiments are also accomplished by a method whereby a computer (or a CPU or an MPU) of the system or the apparatus reads out and executes the program codes stored in the storing medium. In this case, the program codes themselves read out of the storing medium realize the functions of the embodiments mentioned above and the storing medium in which the program codes have been stored constructs the invention. As such a storing medium for supplying the program codes, for example, a floppy (registered trademark) disk, a hard disk, an optical disk, a magnetooptic disk, a CD-ROM, a CD-R, a magnetic tape, a non-volatile memory card, a ROM, or the like can be used.

Not only the case where the computer executes the read-out program codes, so that the functions of the embodiments mentioned above are realized but also the following case is incorporated. That is, a case where an OS (operating system) or the like which is operating in the computer executes a part or all of actual processes based on instructions of the program codes, and the functions of the embodiments mentioned above are realized by those processes is also incorporated.

Further, a case where the program codes read out of the storing medium are written into a memory equipped for a function expanding board inserted in the computer or a function expanding unit connected to the computer and, thereafter, the functions of the embodiments mentioned above are realized based on the instructions of the program codes as follows is also incorporated. That is, a case where a CPU or the like equipped for the function expanding board or the function expanding unit executes a part or all of actual processes and the functions of the embodiments mentioned above are realized by those processes is also incorporated.

The program codes of the software for realizing the functions of the embodiments mentioned above are distributed through a network, so that the functions of the embodiments mentioned above are accomplished as follows. That is, the functions of the embodiments mentioned above are also accomplished by a method whereby the program codes are stored into a storing unit such as hard disk, memory, or the like of the system or the apparatus or into a storing medium such as CD-RW, CD-R, or the like, and a computer (or a CPU or an MPU) of the system or the apparatus reads out and executes the program codes stored in the storing unit or the storing medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-115576, filed Apr. 25, 2008, and 2009-094864, filed Apr. 9, 2009, which are hereby incorporated by reference herein in their entirety.

What is claimed is:

1. An image forming apparatus comprising:
   first and second image forming units, each detachable from the image forming apparatus and each having a memory, wherein an image is formed by one of a first mode, in which the image is formed by using the first and second image forming units, and a second mode, in which the image is formed by using the first image forming unit without using the second image forming unit; and
   a control unit configured to control a writing operation of the memories,
   wherein the control unit controls the writing operation of the memory of the second image forming unit to write first information regarding usage of the first image forming unit into the memory of the second image forming unit in the second mode, and wherein the control unit decreases a frequency of writing the first information regarding usage of the first image forming unit into the memory of the second image forming unit in the second mode according to the first information regarding usage of the first image forming unit.

2. The image forming apparatus according to claim 1, wherein, in a case that a value indicated by the first information regarding usage of the first image forming unit is equal to a predetermined value or more, the control unit decreases the frequency of writing the first information so as to be lower than a frequency of writing the first information when the value indicated by the first information regarding usage of the first image forming unit is less than the predetermined value.

3. The image forming apparatus according to claim 1, wherein the control unit calculates information regarding the frequency of writing the first information by using the first information regarding usage of the first image forming unit.

4. The image forming apparatus according to claim 1, wherein the first and second image forming units respectively contain developer for different colors, and
   wherein the first information regarding usage of the first image forming unit includes information regarding usage of the developers.

5. The image forming apparatus according to claim 1, wherein second information regarding usage of the second image forming unit is written into the memory of the second image forming unit in the first mode, and
   wherein the frequency of writing the first information regarding usage of the first image forming unit into the memory of the second image forming unit in the second mode, is lower than a frequency of writing the second information regarding usage of the second image forming unit, which is written into the memory of the second image forming unit in the first mode.

6. The image forming apparatus according to claim 5, further comprising a comparing unit configured to compare the first information regarding usage of the first image forming unit with the second information regarding usage of the second image forming unit,
   wherein the control unit decreases the frequency of writing the first information regarding usage of the first image forming unit into the memory of the second image forming unit in the second mode based on a result of the comparison by the comparing unit.

7. The image forming apparatus according to claim 6, wherein, when it is determined by the comparing unit that a ratio of the first information regarding usage of the first image forming unit and the second information regarding usage of the second image forming unit is equal to a predetermined value or more, the control unit decreases the frequency of writing the first information regarding usage of the first image forming unit into the memory of the second image forming unit in the second mode.

8. The image forming apparatus according to claim 5, wherein the control unit calculates information regarding the frequency of writing the first information regarding usage of the first image forming unit into the memory of the second image forming unit in the second mode based on the first information regarding usage of the first image forming unit stored in the memory of the second image forming unit.

9. The image forming apparatus according to claim 5, wherein the first and second image forming units respectively contain developer for different colors, and wherein the first information regarding usage of the first image forming unit includes information regarding usage of the developers.

\* \* \* \* \*